United States Patent [19]

Cybulski

[11] Patent Number: 4,564,871
[45] Date of Patent: Jan. 14, 1986

[54] AUTOMATIC RECORD-LOCKOUT MECHANISM

[75] Inventor: Claude E. Cybulski, Oakdale, Minn.

[73] Assignee: Minnesota Mining and Manufacturing Company, St. Paul, Minn.

[21] Appl. No.: 565,879

[22] Filed: Dec. 27, 1983

[51] Int. Cl.⁴ ............................................. G11B 15/04
[52] U.S. Cl. ...................................... 360/60; 360/132
[58] Field of Search .................................. 360/60, 132

[56] References Cited

U.S. PATENT DOCUMENTS

| | | | |
|---|---|---|---|
| 3,721,772 | 3/1973 | Miura et al. | 360/132 |
| 3,826,489 | 7/1974 | Watkins | 360/132 |
| 4,053,935 | 10/1977 | Shiba | 360/60 |
| 4,352,473 | 10/1982 | Satoh et al. | 242/199 |
| 4,389,690 | 6/1983 | Oishi et al. | 360/132 |
| 4,484,248 | 11/1984 | Ogiro et al. | 360/132 |
| 4,513,330 | 4/1985 | Nakao | 360/60 |

FOREIGN PATENT DOCUMENTS

PCT/AU81/-
  190 12/1981 Australia .
53-132317 11/1978 Japan ..................................... 360/60

Primary Examiner—Raymond F. Cardillo, Jr.
Assistant Examiner—Alyssa H. Bowler
Attorney, Agent, or Firm—Donald M. Sell; James A. Smith; William B. Barte

[57] ABSTRACT

Recording tape cassette has pivotable spring means including a rocord-lockout tab which blocks an opening when the spring means is cocked. When placed on a cassette deck, a fixed tang on the deck releases the cocking, allowing the spring means and its record-lockout tab to pivot to a retracted position, thus unblocking the opening. Thereafter, a feeler on the deck can enter that opening to disable the record function.

17 Claims, 5 Drawing Figures

AUTOMATIC RECORD-LOCKOUT MECHANISM

FIELD OF THE INVENTION

The invention concerns record-lockout mechanisms for recording tape cassettes.

BACKGROUND ART

Recording tape cassettes commonly have in one edgewall an opening which is blocked by a tab cored out from either the cover or the base of the cassette. After a recording has been made, accidental erasure is prevented by manually breaking off the tab. This allows a feeler on the cassette deck to enter the opening, and such movement of the feeler disables the erase and record functions. If one later wishes to make a new recording, one covers the record-lockout opening with a piece of the tape and then removes the tape to protect the new recording. U.S. Pat. No. 4,352,473 (Satoh et al.) shows a typical record-lockout tab at the left-hand corner of FIG. 1. An elaborate record-lockout mechanism is disclosed and claimed in U.S. Pat. No. 3,826,489 (Watkins, Jr.), but it also must be manipulated manually. If one were forget to actuate the record-lockout mechanism, the recording might later be accidentally erased.

DISCLOSURE OF THE INVENTION

The present invention concerns a recording tape cassette incorporating a record-lockout tab which automatically unblocks the record-lockout opening upon removing the cassette from a cassette deck. As do all present recording tape cassettes, the novel cassette has a housing including broad, parallel facewalls and connecting edgewalls, in one of which is formed a record-lockout opening. In the cassette of the present invention, the housing incorporates an automatic record-lockout mechanism comprising spring means including a record-lockout tab pivotably mounted between said facewalls, and means mounted between said facewalls for cocking said spring means with its record-lockout tab blocking the record-lockout opening, said spring means including means actuatable by a tang projecting from a cassette deck for releasing said cocking means while retaining said record-lockout tab in the blocking position in the presence of the tang and allowing said tab to pivot to unblock the record-lockout opening when the cassette is removed from the deck and its tang.

To provide compatibility with existing audio cassette decks, the record-lockout opening is preferably located in a side edgewall near the rear edgewall. This provides adequate space for the spring means and cocking means in the corner of the cassette beyond the adjacent spool of tape. Preferably there is a second opening in the edgewalls near the record-lockout opening for allowing the tang to contact the tang-actuatable means and to retain the record-lockout tab in the blocking position until removing the cassette from the deck. Although the tang-receiving opening may be contiguous with the record-lockout opening, it preferably is formed in the rear edgewall to permit the tang to be fixed. When there is a tang-receiving opening in the rear edgewall and the record-lockout opening is in a side edgewall, better rigidity is obtained when the rear and side edgewalls intersect at the corner of the cassette, thus separating those two openings.

In one embodiment of the invention, the spring means includes a pivotable plastic part comprising a record-lockout tab, and the plastic part is pivoted by a metal coil spring. In more economical embodiments, the spring means is a leaf spring having an offset portion which serves as the record-lockout tab. Conveniently such a spring may be secured at one of its ends to an edgewall, and a pawl may hold the spring near its free end in the cocked position. When the cassette is positioned on a deck equipped with a fixed tang, the pawl contacts and is retracted by the tang, allowing the end of the spring to rest against the tang until the cassette is withdrawn, whereupon the spring is allowed to relax and thus unblock the record-lockout opening.

THE DRAWING

DETAILED DESCRIPTION

Figure 1:
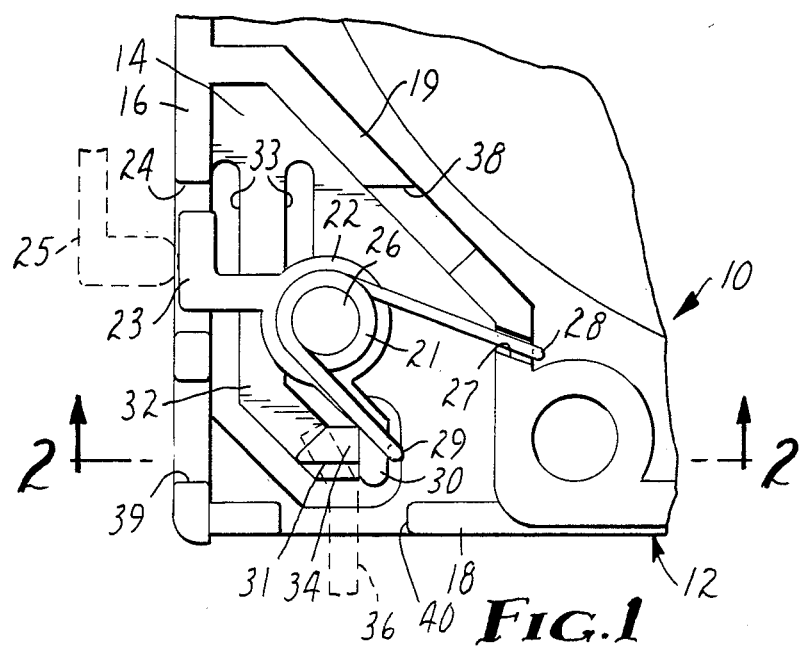
FIG. 1 is a fragmentary plan view of a recording tape cassette having its cover removed to reveal its automatic record-lockout mechanism.
Figure 2:
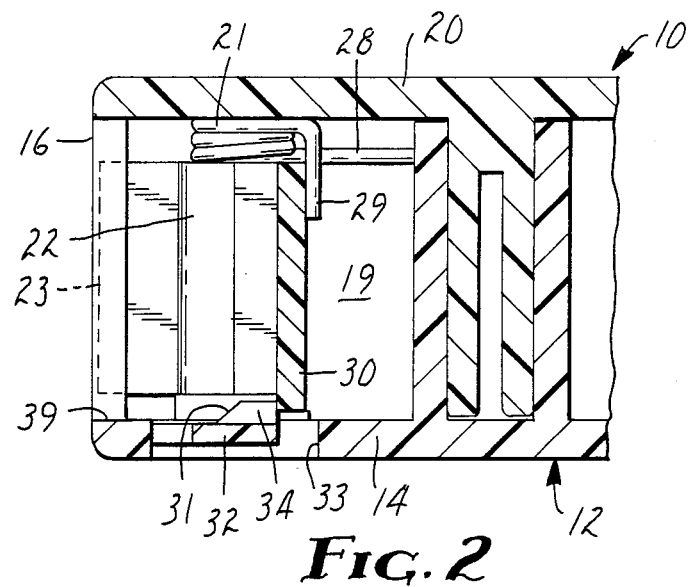
FIG. 2 is a cross-section along line 2—2 of FIG. 1 with the cover in place.

The tape cassette 10 shown in FIGS. 1 and 2 has a base 12 having a broad facewall 14, a side edgewall 16, a rear edgewall 18 and a corner wall 19. Pivotably mounted between the broad facewalls of the base 12 and cover 20 (FIG. 2) is a spring means consisting of a wire coil spring 21 and a pivotable plastic part 22 which includes a record-lockout tab 23 that blocks a record-lockout opening 24 in the side edgewall 16. This prevents a feeler 25 on a tape deck (not shown) from entering the record-lockout opening 24.

The plastic part 22 is journalled on a post 26 extending from the broad facewall 14. The coil spring 21, which also fits on the post 26 is fixed at one end by a first leg 28 which passes through a channel 27 in the corner wall 19 and extends downwardly along the corner wall. At its other end, the spring 21 has a second leg 29 which is held by an arm 30 of the plastic part 22 to retain the spring 21 in a cocked position. The arm 30 in turn is held by a pawl 31 at the free end of a trigger 32 formed in the broad facewall 14 by being cut away at 33. The pawl 31 has a bevel 34 so that when the cassette 10 is positioned on the cassette deck, a fixed bent tang 36 on the deck strikes the bevel 34 and forces the trigger 32 downwardly, thus releasing the pivotable plastic part 22 to override the trigger 32 and to pivot a short distance clockwise until its arm 30 comes to rest against the bent portion of the tang 36. While the cassette 10 is being moved to its operative position, the arm 30 slides along the bent portion of the tang 36 until the tab 23 returns nearly to its original position, thus blocking the record-lockout opening 24.

When starting to withdraw the cassette 10 from the deck, the plastic part 22 rotates clockwise while its arm 30 slides along the bent portion of the tang 36, thus insuring against the trigger 32 being reset upon complete removal of the cassette. When the arm 30 clears the tang 36, the plastic part 22 continues to rotate until the record-lockout tab 23 comes to rest in an aperture 38 in the corner wall 19. This also carries the arm 30 away from the opening 40 in the rear edgewall 18, thus allowing the cassette 10 later to be positioned for playback. Because rotation of the plastic part 22 unblocks the record-lockout opening 24, the feeler 25 would enter the opening 24 and thus disable the erase and recording functions.

The cassette 10 can be played on an ordinary cassette deck but recorded only on a special cassette deck that will not accept an ordinary cassette. For this reason, the side edgewall 16 is formed with a second record-lockout opening 39 in the standard position. Since the opening 39 is always unblocked, the cassette 10 cannot accidentally be recorded on an ordinary cassette recorder. Because an ordinary cassette lacks the opening 40 in the rear edgewall 18, the tang 36 would prevent it from being placed on the special cassette deck.

Figure 3:
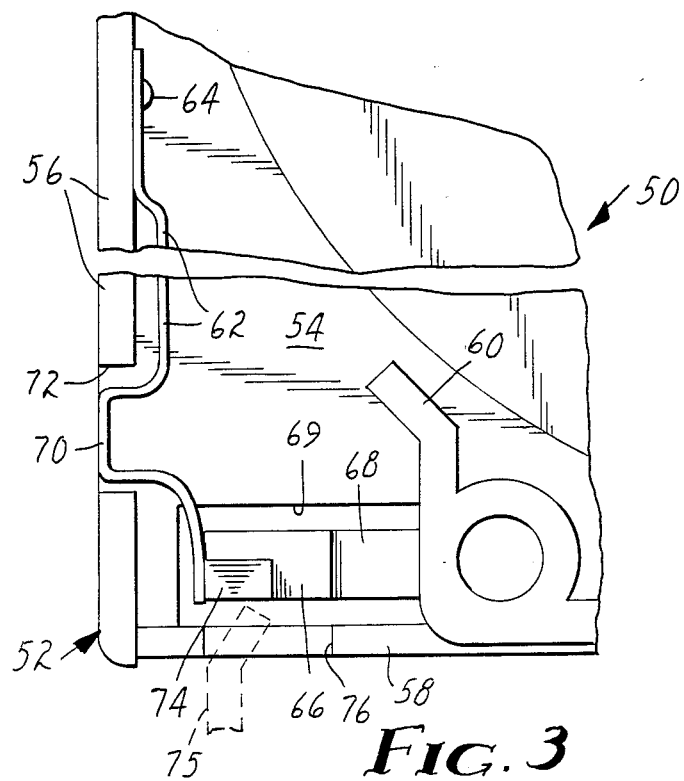
FIG. 3 is a fragmentary plan view of a second recording tape cassette, cover removed to reveal its automatic record-lockout mechanism.

The tape cassette 50 of FIG. 3 has a base 52 including a broad facewall 54, a side edgewall 56, a rear edgewall 58 and a partial corner wall 60. Pivotably mounted between the broad facewalls of the base 52 and cover (not shown) is a spring means consisting of a metal leaf spring 62, one end of which is secured by a protuberance from the side edgewall 56 which fits through a perforation in the spring and has been softened to provide a knob 64 that is larger than the perforation. The spring is held in a cocked position at its other end by a pawl 66 at the free end of a trigger 68 formed in the broad facewall 54 by being cut away at 69. The spring 62 is deformed to provide a record-lockout tab 70 which blocks a record-lockout opening 72 when the spring is in the cocked position shown in FIG. 3.

The pawl 66 has a bevel 74 so that when the cassette 50 is positioned on a cassette deck similar to that used with the cassette 10, a fixed bent tang 75 enters an opening 76 in the rear edgewall 58 to press the trigger 68 down, allowing the spring to pivot part way across the pawl 66 until stopped by the tang, which is shown partially entering the cassette 50. Upon removing the cassette, the spring snaps to a semi-relaxed position against the corner wall 60, thus unblocking the record-lockout opening 72.

Figure 4:
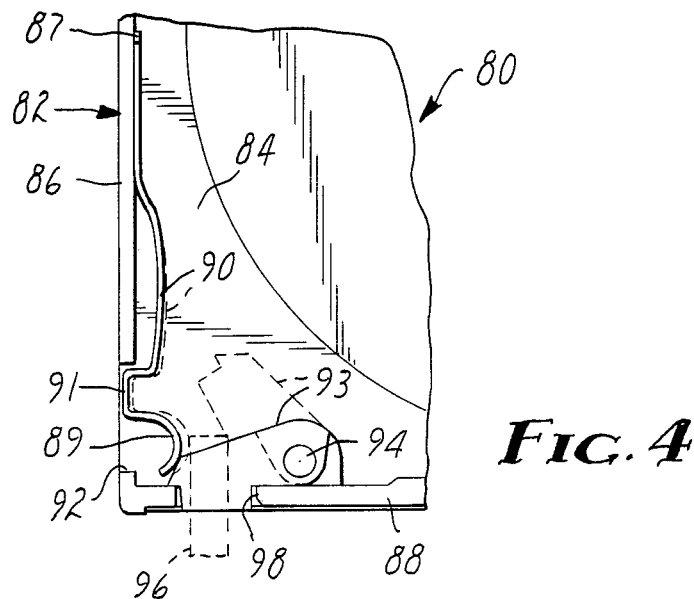
FIG. 4 is a fragmentary plan view of a third recording tape cassette, cover removed, with its automatic record-lockout mechanism cocked.
Figure 5:
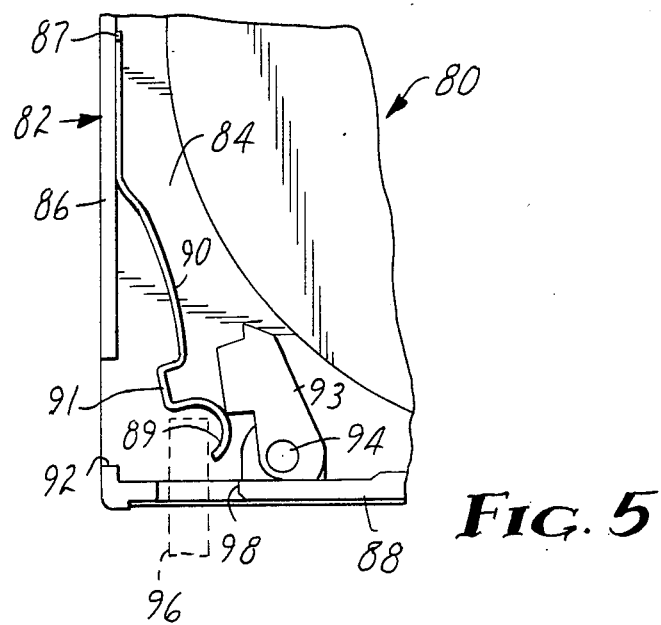
FIG. 5 is a view similar to that of FIG. 4 after actuation of the record-lockout mechanism.

The tape cassette 80 of FIGS. 4 and 5 has a base 82 including a broad facewall 84, a side edgewall 86 and a rear edgewall 88. One end of a metal leaf spring 90 is secured to the side edgewall 86 by tabs 87 which penetrate into the base 82 and cover (not shown). The free end 89 of the spring 90 is deformed to provide a record-lockout tab 91 which partially blocks a record-lockout opening 92. The spring is held in the cocked position of FIG. 4 by a plastic pawl 93 which is pivotally mounted on a post 94 projecting from the broad facewall 84 and serves as a trigger.

When the cassette 80 is positioned on a deck, a fixed straight tang 96 enters an opening 98 in the rear edgewall 88 to pivot the pawl 93 to the dotted position of FIG. 4. This allows the spring to pivot slightly until stopped by the tang 96. Upon removing the cassette, the spring snaps to the semi-relaxed position shown in FIG. 5 and is stopped by the pawl 93.

The free end 89 of the leaf spring 90 is shaped to leave permanently unblocked a portion of the record-lockout opening 92 to receive the record-disable feeler of an ordinary tape deck, for reasons explained above in connection with the second record-lockout opening 38 of FIG. 1.

SPECIAL APPLICATION

The invention should be especially useful in cassette recorders embodying the recording system disclosed in Australian Patent Specification No. PCT/AU81/190 filed Dec. 16, 1981 entitled "Verification of Recorded Messages". That system simultaneously records audio signals together with digital signals in part derived from the audio. The digital signals are used on reproduction to authenticate the audio signals. Since that system is intended primarily for use by police to make recordings to be put into evidence in court proceedings, it is vital to prevent a recorded cassette from being erased by inadvertently attempting to record it either on an ordinary recorder or on a recorder especially adapted for recording such a cassette. However, it is desirable to be able to play the cassette on an ordinary recorder so that the use of the special recorder can be confined to authorized persons.

To save development and manufacturing costs, a system such as that of the Australian patent specification should use a cassette which is identical to a commercially available cassette, except being modified as mentioned in the above detailed description of the drawings.

I claim:

1. Tape cassette comprising a housing having broad, parallel facewalls and connecting edgewalls, in one of which is formed a record-lockout opening, said housing incorporating an automatic record-lockout mechanism comprising spring means, including a record-lockout tab pivotably mounted between said facewalls, for biasing said tab away from said record-lockout opening, and means mounted between said facewalls for cocking said spring means with its record-lockout tab blocking said record-lockout opening, said spring means including means actuatable by a tang projecting from a cassette deck for releasing said cocking means while retaining said record-lockout tab in the blocking position in the presence of the tang and allowing said tab to pivot to unblock the record-lockout opening when the cassette is removed from the deck and its tang.

2. Cassette as defined in claim 1 wherein the edgewalls are formed to provide near the record-lockout opening a second opening for allowing the tang to contact the tang-actuatable means.

3. Cassette as defined in claim 2 wherein said second opening is formed in the rear edgewall, and said record-lockout opening is formed in a side edgewall.

4. Cassette as defined in claim 1 wherein said spring means comprises a leaf spring.

5. Cassette as defined in claim 4 wherein said leaf spring is secured at one end to an edgewall, and the cassette includes a trigger which can hold the spring means in the cocked position until released by contact with said tang.

6. Cassette as defined in claim 5 wherein the leaf spring is metal and as deformed to provide said record-lockout tab.

7. Cassette as defined in claim 1 wherein said cocking means includes a trigger formed in a broad facewall of the cassette.

8. Cassette as defined in claim 7 including a pawl at the free end of the trigger, the pawl being formed with a bevel which is contacted by said tang when the cassette is positioned on said deck.

9. Cassette as defined in claim 8 wherein said spring means includes a metal coil spring.

10. Cassette as defined in claim 9 wherein said spring means includes a plastic part which is journalled on a post projecting from a broad facewall.

11. Cassette as defined in claim 10 wherein said metal coil spring fits around said post.

12. In combination a cassette and cassette deck, said cassette comprising:
   a housing having broad, parallel facewalls and connecting edgewalls which are formed with a record-lockout opening and a tang-receiving opening,
   spring means, including a record-lockout tab pivotably mounted between said facewalls, for biasing said tab away from said record-lockout opening, and
   means mounted between said facewalls for cocking said spring means with its record-lockout tab blocking said record-lockout opening,
   said deck comprising:
   a tang which, upon entering said tang-receiving opening, releases said cocking means while retaining said record-lockout tab in the blocking position and, upon removal of the cassette from the deck, allows said tab to pivot to unblock the record-lockout opening.

13. Combination as defined in claim 12 wherein said cocking means includes a trigger formed in a broad facewall of the cassette.

14. Combination as defined in claim 13 wherein said trigger has a pawl at its free end, and the pawl is formed with a bevel which is contacted by said tang when the cassette is positioned on the deck.

15. Combination as defined in claim 14 wherein said tang includes at its free end a bent portion which allows said spring means to move an appreciable distance across the pawl when the tang first depresses the trigger and then retracts the spring means across part of that distance when the cassette is moved to its operative position on the deck.

16. Combination as defined in claim 15 wherein said spring means includes a metal leaf spring which is deformed to provide said record-lockout tab.

17. Combination as defined in claim 15 wherein said spring means comprises a metal coil spring and a plastic part including said record-lockout tab.

* * * * *